United States Patent
Sovio et al.

(10) Patent No.: US 12,197,563 B2
(45) Date of Patent: Jan. 14, 2025

(54) APPARATUS AND METHOD FOR PROTECTING SHARED OBJECTS

(71) Applicants: Huawei Technologies Co., Ltd., Shenzhen (CN); Sampo Sovio, Helsinki (FI)

(72) Inventors: Sampo Sovio, Helsinki (FI); Qiming Li, Helsinki (FI); Gang Lian, Helsinki (FI); Kui Wang, Helsinki (FI); Santeri Salko, Helsinki (FI); Vladimir Ushakov, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/792,292

(22) PCT Filed: Jan. 29, 2020

(86) PCT No.: PCT/EP2020/052089
§ 371 (c)(1),
(2) Date: Jul. 12, 2022

(87) PCT Pub. No.: WO2021/151476
PCT Pub. Date: Aug. 5, 2021

(65) Prior Publication Data
US 2023/0058046 A1 Feb. 23, 2023

(51) Int. Cl.
*G06F 21/53* (2013.01)

(52) U.S. Cl.
CPC ........ *G06F 21/53* (2013.01); *G06F 2221/034* (2013.01)

(58) Field of Classification Search
CPC .. G06F 2221/034; G06F 21/74; G06F 21/121; G06F 21/53
See application file for complete search history.

(56) References Cited

U.S. PATENT DOCUMENTS

| 9,594,927 B2 | 3/2017 | Zimmer et al. |
| 9,628,279 B2 | 4/2017 | Probert et al. |
| 2015/0347724 A1 | 12/2015 | Torrey |
| 2020/0028693 A1 | 1/2020 | Wu et al. |

OTHER PUBLICATIONS

US 9,942,041 B1, 04/2018, Roth et al. (withdrawn)
AOSP, "Trusty TEE," https://source.android.com/docs/security/trusty?hl=zh-cn, Last updated (UTC): Sep. 18, 2022, 4 pages.
Beniamini, G., "Trust Issues: Exploiting Trustzone Tees," Project Zero, Jul. 24, 2017, 16 pages.

*Primary Examiner* — Brian F Shaw
(74) *Attorney, Agent, or Firm* — Conley Rose, P.C.

(57) ABSTRACT

An apparatus is configured to protect the privacy of shared objects by loading shared object into a user memory of a rich execution environment. The shared object has an encrypted segment and metadata. A request for decryption is sent to a trusted execution environment and the encrypted segment is decrypted based on the metadata and a predetermined platform key to produce a decrypted segment. The decrypted segment is written into the shared object. A request to lock the shared object is sent and a memory occupied by the shared object is locked or set to execute only. The lock of the memory region occupied by the decrypted shared object maps the memory region to be non-readable and non-writable to applications executing at a first privilege level and to the operating system kernel executing at a second privilege level.

20 Claims, 5 Drawing Sheets

APPARATUS AND METHOD FOR PROTECTING SHARED OBJECTS

CROSS-REFERENCE TO RELATED APPLICATIONS

This is a U.S. National Stage of International Patent Application No. PCT/EP2020/052089 filed on Jan. 29, 2020, which is hereby incorporated by reference in its entirety.

TECHNICAL FIELD

The aspects of the disclosed embodiments relate generally to apparatus for computer security and more particularly to protecting privacy of shared software objects.

BACKGROUND

When developing computer applications, it is common practice to incorporate third party libraries, Software Development Kits (SDK's), or other third party shared objects to facilitate efficient application development. An SDK or shared object may incorporate novel technologies that provide a competitive edge for both the shared object developer as well as third party application developers. For example, a shared object may provide a novel graphics processing technology that results in a superior user experience.

When a shared object is distributed it is relatively easy to inspect and reverse engineer computer code contained in the shared object exposing any novel technologies to misuse. Conventional shared objects often include cryptographic means for protecting the integrity of a shared object and to detect unauthorized modifications. However, there are no reliable means available for protecting the confidentiality of the contents of a shared object throughout its lifecycle.

Thus, there is a need for improved methods and apparatus that protect privacy of software assets distributed as shared objects while also allowing those shared objects to be executed in a rich execution environment. Accordingly, it would be desirable to provide methods and apparatus that address at least some of the problems described above.

SUMMARY

The aspects of the disclosed embodiments are directed to protecting privacy of software assets distributed as shared objects while still allowing those shared objects to be executed in a rich execution environment. This and other objects are solved by the subject matter of the independent claims. Further advantageous modifications can be found in the dependent claims.

According to a first aspect the above and further objects and advantages are obtained by an apparatus. In one embodiment, the apparatus includes a processor coupled to a memory. The processor and the memory are configured to provide a rich execution environment and a trusted execution environment. The memory and processes in the trusted execution environment are protected from access or modification by applications executing within the rich execution environment. The processor and the memory are further configured to provide, within the rich execution environment, a first computing environment configured to execute at a first privilege level and a second computing environment configured to execute at a second privilege level. In one embodiment, the first privilege level is more restrictive than the second privilege level. The processor is also configured to load, within the rich execution environment, a shared object into a user memory. In one embodiment, the shared object comprises an encrypted segment and a metadata. The processor is also configured to send, from the rich execution environment, a request for decryption to the trusted execution environment, wherein the request for decryption comprises the metadata and the encrypted segment. The processor is further configured to decrypt, within the trusted execution environment, the encrypted segment to produce a decrypted segment. In one embodiment, the decryption is based on the metadata and a predetermined platform key. The processor is configured to receive within the rich execution environment a decryption response. The decryption response comprises the decrypted segment. The processor is further configured to write the decrypted segment into the shared object and send from the first computing environment to the second computing environment a request to lock the shared object. The processor is configured to set, while executing at the second privilege level, a memory occupied by the shared object to execute only. The lock, or setting to execute only, of the memory region occupied by the decrypted shared object maps the memory region to be non-readable to all applications executing at the first privilege level, and also marks the memory region as non-readable even to the operating system kernel which may be executing at the second privilege level.

In a first possible implementation form of the apparatus the metadata comprises an encrypted asset key. The encrypted asset key is an asset key encrypted based on the predetermined platform key. The processor is further configured to, within the trusted execution environment, decrypt the encrypted asset key based on the predetermined platform key, and decrypt the encrypted segment based on the decrypted asset key. This allows the use of more efficient symmetric cryptography for decryption of the encrypted segment while still gaining the security advantages of more computationally intensive asymmetric key cryptography.

In a possible implementation form of the apparatus the metadata comprises a plurality of encrypted key data, wherein the plurality of encrypted key data comprises the asset key encrypted based on a different one of a plurality of platform keys. The processor is further configured to select the encrypted key data from the plurality of encrypted key data based on the predetermined platform key. This provides the advantage of allowing a single encrypted shared object to be decrypted and executed on a plurality of computing apparatus having different platform keys.

In a possible implementation form of the apparatus the request for decryption is sent by an agent executing within the rich execution environment. The processor is further configured to, within the trusted execution environment, validate an integrity of the agent before decrypting the encrypted segment. Validating the agent provides additional security by ensuring that the decryption request was sent by an approved agent and that the agent has not been infected or otherwise compromised.

In a possible implementation form of the apparatus the predetermined platform key is a public portion of an asymmetric key pair. Asymmetric key cryptography allows public key infrastructure (PKI) and provides improved resistance to attacks.

In a possible implementation form of the apparatus the asset key is a symmetric key. The encrypted segment may be very large, so using symmetric key cryptography provides reduced processing as compared to asymmetric cryptography.

In a possible implementation form of the apparatus the rich execution environment comprises a third computing environment configured to execute at a third privilege level. The second privilege level is more restrictive than the third privilege level. The processor is configured to, while executing at the third privilege level, set the memory occupied by the shared object to be execute only. Use of a third privilege level provides tighter control and reduced size of software executed at the third privilege level, resulting in improved security.

In a possible implementation form of the apparatus the first computing environment comprises a user application, the second computing environment comprises an operating system, and the third computing environment comprises a hypervisor. A hypervisor is typically a smaller and more thoroughly tested application. Applying the lock within a hypervisor improves security and reduces available attack vectors.

In a possible implementation form of the apparatus the shared object comprises a constructor routine, which when executed by the processor, causes the processor to send the decryption request. Including a constructor routine provides additional flexibility and an opportunity to supplement functionality of the SOP Agent.

In a possible implementation form of the apparatus the trusted execution environment comprises a trusted application and the rich execution environment comprises an agent. The trusted application is configured to receive the decryption request from the agent, validate an integrity of the agent, and, when the integrity is valid, decrypt the encrypted segment to produce the decrypted segment and return the decrypted segment to the agent. Validating the agent prior to decryption provides an opportunity to detect that the agent has been compromised prior to sending the decrypted agent to what may be a malicious application.

In a possible implementation form of the apparatus the encrypted segment occupies a first memory area, and writing the decrypted segment into the shared object comprises one or more of writing the decrypted segment into the first memory area, writing the decrypted segment into a second memory area and incorporating the second memory area into the shared object. Writing the decrypted segment to the second memory area may be advantageous for example when it is easier or more efficient to lock the second memory area than the first memory area. The decrypted segment may be larger than the encrypted segment requiring additional memory or in certain apparatus it may be more efficient to allocate new space than to overwrite already used space.

In a possible implementation form of the apparatus, the apparatus comprises a mobile communications apparatus. A seamless user experience among many applications relies on integrating many shared objects within a single device. Protecting shared objects is becoming increasingly important in modern mobile computing apparatus.

According to a second aspect the above and further objects and advantages are obtained by a method. In one embodiment, the method includes loading, within a rich execution environment, a shared object into a user memory, wherein the shared object comprises an encrypted segment, a metadata, and a constructor routine. Sending from the rich execution environment a request for decryption to a trusted execution environment, wherein the request for decryption comprises the metadata and the encrypted segment. Decrypting, within the trusted execution environment, the encrypted segment to produce an unencrypted segment, wherein the decryption is based on the metadata and a predetermined platform key. Receiving within the rich execution environment a decryption response from the trusted execution environment, wherein the decryption response comprises a decrypted segment. Writing the decrypted segment into the shared object. Setting, while executing at a second privilege level, a memory occupied by the shared object to be execute only and accessing, at a first privilege level, the shared object from a user application, wherein the first privilege level is more restrictive than the second privilege level. The lock, or setting to execute only, of the memory occupied by the decrypted shared object maps the memory region to be non-readable to all applications executing at the first privilege level, and also marks the memory region as non-readable even to the operating system kernel which may be executing at the second privilege level.

In a possible implementation form of the method the encrypted segment is encrypted based on an asset key, and the metadata comprises an encrypted asset key that is the asset key encrypted based on the predetermined platform key. The method includes decrypting, within the trusted execution environment, the encrypted asset key based on the predetermined platform key and decrypting, within the trusted execution environment, the encrypted segment based on the asset key. This allows the use of more efficient symmetric cryptography for decryption of the encrypted segment while still gaining the security advantages of more computationally intensive asymmetric key cryptography.

According to a third aspect the above and further objects and advantages are obtained by non-transitory computer readable media. In one embodiment, the non-transitory computer readable media has stored thereon program instructions that when executed by a processor cause the processor to perform the method according to any one of the possible implementation forms.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
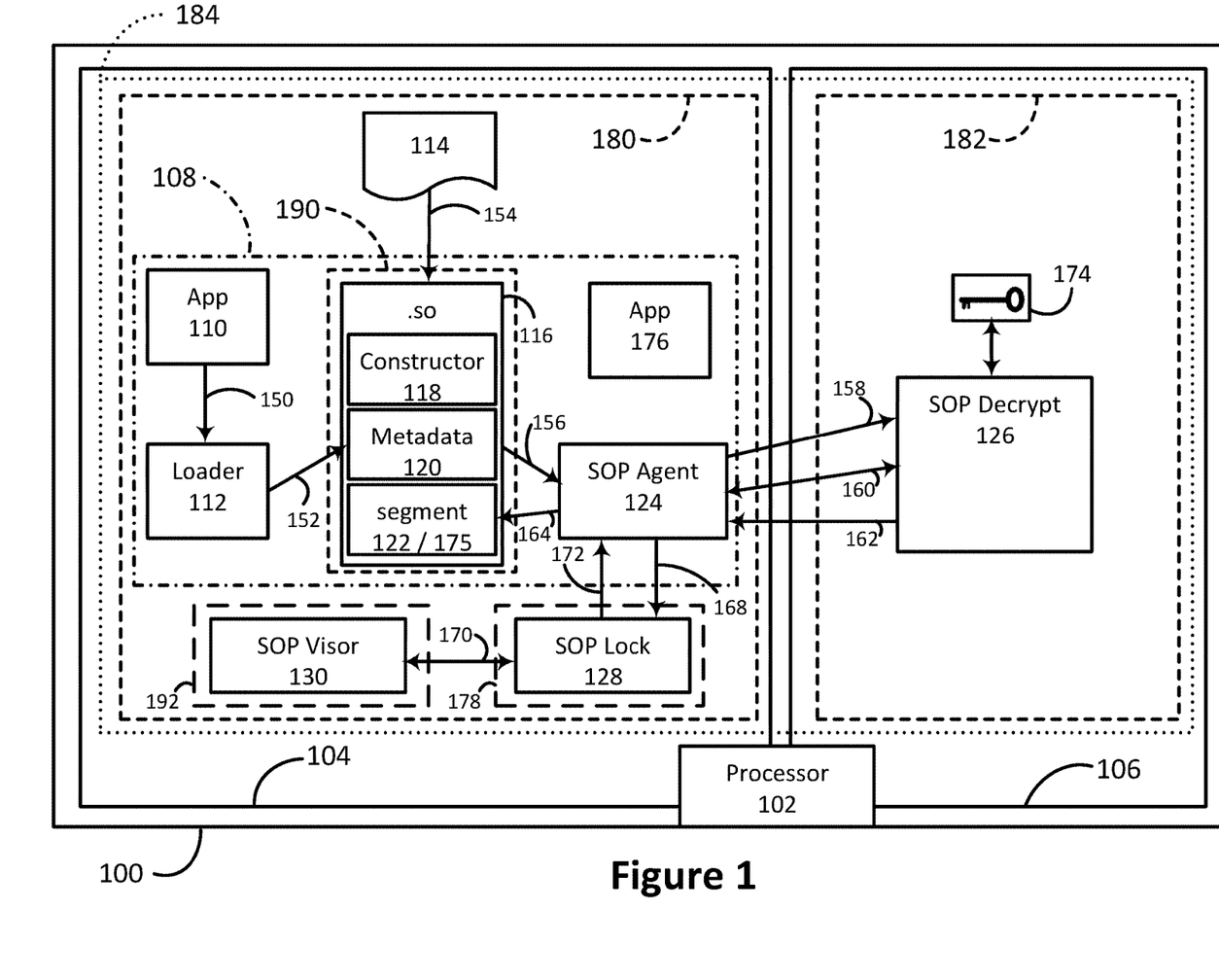
FIG. 1 illustrates a block diagram of an exemplary computing apparatus incorporating aspects of the disclosed embodiments.

Referring to FIG. 1, a schematic block diagram of an exemplary apparatus 100 incorporating aspects of the disclosed embodiments is illustrated. The aspects of the disclosed embodiments are directed to preventing the theft of software assets being distributed as shared objects to third party developers. The computing apparatus 100 is appropriate for protecting the privacy of shared objects such as software libraries, software development kits (SDK) or other types of redistributable software assets. When a proprietary technology is incorporated into an SDK and distributed to third party application developers, the assets bundled within the SDK become vulnerable to theft. The embodiments disclosed herein provide methods and apparatus configured to protect the privacy of shared objects and help prevent loss of these software assets.

As shown in FIG. 1, the apparatus 100 includes a processor 102 coupled to a memory 184. Although only one memory 184 is illustrated in FIG. 1, it will be understood that the memory 184 can comprise one or more memory blocks or modules. The processor 102 and the memory 184 are configured to provide a rich execution environment 104 and a trusted execution environment 106. As will be discussed further below, the trusted execution environment 106 includes a secure memory 182 and a secure portion of the processor 102, and the rich execution environment 104 includes a separate memory 180 and an unsecure portion of the processor 102. In the example of FIG. 1, the memory 184 and processes 126 executing within the trusted execution environment 106 are protected from access or modification by applications executing within the rich execution environment 104.

The processor 102 and the memory 184 are further configured to provide, within the rich execution environment 104, a first computing environment 108 configured to execute at a first privilege level and a second computing environment 158 configured to execute at a second privilege level. In one embodiment, the first privilege level is more restrictive than the second privilege level.

The privilege levels are configured to prevent one process, such as the application 110 executing in user memory 108, from inadvertently or maliciously accessing or modifying the computing resources belonging to a different process, such as a second application 176 or system processes 128, 130. The processor 102 is configured to prevent a process executing at one privilege level from viewing or accessing computing resources associated with a different process executing at the same privilege level or at a lower or more restrictive privilege level. A more restrictive privilege level is a privilege level that allows access to a smaller set of computing resources as compared to a less restrictive privilege level. Conversely, a less restrictive or higher privilege level is a privilege level that allows access to a larger set of computing resources as compared to a lower privilege level.

For example, a processor based on the Acorn RISK machine ARMv8-A architecture, referred to herein as the ARM architecture, provides 4 privilege levels which may also be referred to as exception levels. Exception level zero (EL0), referred to as unprivileged execution, is the lowest privilege level, least privileged, and most restrictive, while exception level three (EL3) is the highest privilege level, most privileged, and least restrictive. In computing apparatus based on the ARM architecture, exception level 1 (EL1) is often used for execution of an operating system process, and exception level 2 (EL2) may be configured to provide hypervisor support. A process executing at the lowest privilege level is allowed to access and modify computing resources associated with its own process but is not allowed to access or modify computing resources associated with any other processes executing on the computing apparatus 100.

User space applications such as application 110 executing in user memory 108 are typically executed at the lowest privilege level EL0, which is also the most restrictive privilege level. In contrast a process executing at the next higher privilege level, such as EL1 in the ARM example presented above, is allowed to access and modify computing resources of processes executing at the lowest privilege level, EL0, but cannot access, view or modify computing resources of any process executing at the same (EL1) or higher privilege level, such as EL2 or EL3. Thus, the lowest privilege level EL0 is said to be more restrictive than the privilege level EL1.

Importantly, in the computing apparatus 100 access to memory management components, which are used to place a lock on or mark as execute only the memory area 190 occupied by the shared object 116, is allowed only by code executing at one of the higher privilege levels and cannot be accessed by code executing in user space 108. Thus, programs executing within user space at a more restrictive privilege level cannot remove a lock or modify any read only or execute only designations that have been placed on memory areas by a higher privileged program.

As used herein the terms "setting to execute only", "placing an execute only designation on", or "marking as execute only" generally refers to using memory management capabilities of a computing apparatus to configure a portion of the memory in a way that allows the processor to execute instructions stored in the designation memory area but prevents the processor from reading or writing to the memory area that has been set to execute only. As used herein the term "lock", "lock a shared object" or "lock a memory area" refers to setting the subject memory area to execute only such that any data stored in the locked memory area may not be read or modified.

In the illustrated embodiment of FIG. 1, when an application 110 executing within user space 108 identifies the need for a shared object 116, a call 150 is made to engage services of a loader 112, which will load 154 the required shared object 116 into user memory 108. Loading 154 of the shared object 116 may occur during loading of the application 110 or may be otherwise triggered and later loaded during execution of the application 110.

In the example of FIG. 1, the processor 102 is configured to load 154, within the rich execution environment 104, a shared object 116 into a user memory 108. The shared object 116 may be loaded 154 into a user memory 108 within the rich execution environment memory 180 from a non-volatile portion of memory 114. Data may be referred to as being "at-rest" while it is stored in a non-volatile memory 114. The shared object 116 may be protected while at rest by encrypting portions of the shared object, for example by encrypting portions of the shared object 116 that contain proprietary information or software assets.

In one embodiment, the shared object 116 comprises an encrypted segment 122 and a metadata 120. Software assets being protected are encrypted prior to distribution of the shared object 116. These protected software assets may include information such as the executable code and supporting data as well as any other desired information and may be referred to herein as a "segment" or more particularly as a "text segment." The metadata 120 includes information to support decryption of the encrypted segment 122 or otherwise reassemble the shared object 116 in preparation for execution. For example the metadata 120 may include an initialization vector for symmetric cipher, symmetric keys encrypted using the platform key, and algorithm identifiers.

The loaded shared object 116 engages 156 a shared object protection (SOP) agent 124 to handle decryption and preparation of the shared object 116 for execution within the rich execution environment 104. The SOP agent 124 orchestrates decryption, locking, and preparation of the shared object 116 for execution.

The processor 102 is also configured to send, from the rich execution environment 104, a request for decryption 158 to the trusted execution environment 106, wherein the request for decryption comprises the metadata 120 and the encrypted segment 122. In the illustrated embodiment the request for decryption 158 may be sent from the SOP Agent 124 across a security boundary between the rich execution environment 104 and the trusted execution environment 106 to a SOP decrypt application 126, via an appropriately secure communication means. The request for decryption 158 is received by a trusted application, referred to as a SOP Decrypt application 126, executing within the trusted execution environment 106.

The processor 102 is further configured to decrypt, within the trusted execution environment 106, the encrypted segment 122 to produce a decrypted segment 175. In one embodiment, the decryption is based on the metadata 120 and a predetermined platform key 174. The platform key 174 may be an asymmetric key, symmetric key, or other type of cryptographic key material configured to decrypt information that is cryptographically embedded in the metadata 120. In certain embodiments, the platform key 174 may be securely provisioned within the trusted execution environment 106 during a manufacturing process, post manufacturing process, or other appropriately secure provisioning process configured to safely install the platform key 174 within the trusted execution environment 106.

In an exemplary embodiment the metadata 120 includes an encrypted copy of a decryption key that may be used to decrypt the encrypted segment 122. The encrypted copy is decrypted based on the platform key 174 to obtain the decryption key, then the encrypted segment 122 is decrypted based on the decryption key obtained from the metadata 120.

The processor 102 is configured to receive within the rich execution environment 104 a decryption response 162 where the decryption response 162 comprises the decrypted segment 175. The processor 102 is further configured to write the decrypted segment 175 into the shared object 116. The decrypted segment 175 may be written back to the same area of the memory 108 originally occupied by the encrypted segment 122. Alternatively, in certain embodiments, it may be desirable to write the decrypted segment 175 to a different portion of the memory 108 and associate the different portion of the memory with the shared object 116.

In the exemplary embodiment illustrated in FIG. 1 the processor 102 is configured to send from the first computing environment 108 to the second computing environment 178 a request 168 to lock the shared object 116 and to set, while executing at the second privilege level, a memory 190 occupied by the shared object 116 to execute only. The memory area 190 comprises the memory area occupied by the shared object 116. Thus, by locking the memory area 190 or marking the memory area 190 to execute only, applications executing at the more restrictive first privilege level are prevented from reading or modifying the shared object 116.

The first computing environment may for example be a user space executing at a relatively restrictive privilege level, such as the EL0 privilege level described above, that prevents applications 110, 176 executing within the first computing environment 108 from accessing computing resources that are not assigned to them, and importantly prevents access to memory management or memory configuration capabilities of the computing apparatus 100. Preventing user applications 110, 176 which are executing at the first privilege level from accessing memory management or configuration capabilities prevents those user applications 110, 176 from removing the lock or execute only designation that was placed on the memory 190 occupied by the shared object 116.

In certain embodiments it may not be desirable to mark the entire shared object 116 as execute only by locking the full memory area 190. Important assets may be concentrated in the decrypted segment 175. Accordingly, locking only the memory area occupied by the decrypted segment 175 may provide suitable protections for the proprietary technologies.

In the exemplary embodiment illustrated in FIG. 1, the request 158 to lock the memory area 190 may be received by a SOP lock 128 routine executing at a privilege level that is less restrictive than the privilege level of the application 110 or shared object 116. For example the SOP lock routine 128 may execute at the same privilege level as an operating system such as the EL1 privilege level provided by ARM processors as discussed above, while the user space 108 programs execute at a more restrictive privilege level such as the EL0 privilege level provided by ARM processors. Importantly, memory management operations such as setting or resetting memory areas to execute only, are allowed by applications or processes executing at the second privilege level and are not allowed by applications and processes executing at the first privilege level. The functionality of the SOP lock 128 routine may be incorporated into an operating system or other executive application executing at the second privilege level, or alternatively may be provided by a separate routine or process executing at the second privilege level.

Setting to execute only, or locking, the memory area 180 occupied by the shared object 116 effectively protects privacy of the shared object by preventing other possibly malicious applications 176 executing in user space 108 or at the first privilege level from being able to read, copy, or modify the shared object 116.

In one exemplary embodiment the metadata 120 comprises an encrypted asset key. The encrypted asset key can comprise an asset key encrypted based on or encrypted with the predetermined platform key 174. The processor is configured to, within the trusted execution environment 106, decrypt the asset key based on the predetermined platform key 174 and then decrypt the encrypted segment 122 based on the decrypted asset key.

In one embodiment the metadata 120 comprises a plurality of encrypted key data, wherein the plurality of encrypted key data comprises the asset key encrypted based on a different one of a plurality of platform keys. The processor 102 is configured to select the encrypted key data from the plurality of encrypted key data that corresponds with or is based on the predetermined platform key 174.

It may be advantageous for different manufacturers and different device models to use different platform keys 174. Including a plurality of encrypted keys allows a single build of a shared object 116 to be executed on a plurality of different devices having different platform keys. During loading, an encrypted key data corresponding to the available platform key is selected thereby allowing a single encrypted segment to be decrypted on a variety of different devices.

In one embodiment the request for decryption 158 is sent by a SOP agent 124 executing within the rich execution environment 104 to a SOP decrypt routine 126 executing within the trusted execution environment 106. The processor 102 is configured to, within the trusted execution environment 106, validate 160 the integrity of the SOP agent 124 before decrypting the encrypted segment 122. In the event that the SOP agent 124 fails validation, for example when it has been compromised by a virus, the SOP decrypt routine 126 will refuse to decrypt the encrypted segment 122.

To improve security and facilitate provisioning of the computing apparatus 100, it is desirable in certain embodiments to use asymmetric cryptography for the platform key. However, asymmetric cryptography is computationally more expensive than symmetric cryptography. Performance can be improved while maintaining the security benefits of an asymmetric platform key 174 by using a symmetric or secret key as the asset key. The platform key 174 is used to decrypt a relatively small asset key and the asset key is used to decrypt a possibly larger encrypted segment 122.

In certain embodiments it is desirable to have the predetermined platform key 174 be the public portion of an asymmetric key pair. When populating the platform key 174 in the computing apparatus 100 from an external source it may be desirable to maintain the private key portion of the asymmetric key pair within a well-defined security boundary, such as within a hardware device at a physically secure manufacturing facility, and to populate many devices with the corresponding public portion of the platform key pair 174. For example, all phones of a certain model, or distributed by a certain carrier may be populated with the same predetermined platform key.

In one embodiment the rich execution environment comprises a third computing environment 192 configured to execute at a third privilege level. The second privilege level is more restrictive than the third privilege level. The computing apparatus 100 is configured to allow applications executing at the third privilege level to modify memory settings, such as execute only, read only, or read and write memory access privileges, while preventing applications executing at the first or second privilege levels from modifying memory settings. The processor 102 is configured to, while executing at the third privilege level, set the memory 190 occupied by the shared object 116 to be execute only. The third privilege level may for example be a privilege level such as the EL2 privilege level provided in ARM architecture computing apparatus.

In embodiments including a third privilege level, security may be improved by configuring the processor 102 to send a request 170 to lock the memory area 190 from the SOP lock routine 128 to a SOP visor routine 130, where the SOP lock routine 128 is executing at the second privilege level within a second computing environment 178 and the SOP visor routine 130 is executing at the third privilege level within a third computing environment 192. The SOP visor routine 130 can then set as execute only the memory area 190 thereby preventing an operating system executing at the second privilege level, or user applications executing at the first privilege level, from gaining read or write access to the locked memory area 190.

In certain embodiments, the first computing environment 108 comprises user applications, the second computing environment 178 comprises an operating system, and the third computing environment 192 comprises a hypervisor. Modern operating systems have grown in size and functionality, resulting in the need to maintain and update them regularly. Regular updates provide an opportunity for attackers to gain access to the system. Also a large and highly functional software program, such as a modern operating system, is more difficult to secure than smaller software packages having limited functionality, such as a hypervisor. A hypervisor provides much less functionality as compared to an operating system and is therefore significantly smaller in size, requires fewer updates, and is thus inherently more secure. By limiting memory management operations, such as locking or unlocking the memory area 190 occupied by the shared object 116, to applications or processes executing at the third privilege level, security of the overall computing apparatus 100 may be improved.

In certain embodiments the shared object 116 comprises a constructor routine 118.

When executed by the processor 102 the constructor routine 118 will cause the processor 102 to send the decryption request 158. The decryption request 158 may be triggered directly by the constructor routine 118 or the constructor routine 118 may begin an initialization process for the shared object 116 and send the decryption request 158 as part of this initialization process. The constructor routine 118 provides a convenient way to incorporate flexibility into the decryption process.

For example the constructor routine 118 may perform certain preparation steps prior to sending a request 156 to the SOP agent 124 and may also perform additional steps after the SOP agent 124 completes its work thereby adapting a new shared object to be compatible with an existing or currently deployed SOP agent 124. The constructor routine 118 may include information, such as the metadata 120 in the request 156 used to initiate decryption by the SOP agent 124.

In one embodiment a dynamic linker is invoked by the application 110 to load the shared object 116 into memory. The dynamic linker may call the constructor routine 118 and the constructor routine 118 makes a request 156 to the SOP agent 124 for decryption of the encrypted segment 122. Alternatively, the constructor routine 118 may be called or triggered by the application 110 as an initialization step performed prior to the application 110 using any methods or features in the decrypted segment 174. The SOP agent 124 makes a request 158 to the trusted execution environment 106 and provides a starting address and length of the encrypted segment 122, which may be a text segment, along with the metadata 120 to the SOP decrypt routine 126 executing within the trusted execution environment 106.

The SOP decrypt routine 126 executing within the trusted execution environment 106 validates a security level of the device. Validating a security level of the SOP decryption routine 126 can provide assurance that decrypted assets are exposed only to the SOP agent 124 when device security is at an adequate level. For example, in an ANDROID™ device the trusted execution environment should be capable of reading Root Of Trust fields such as the operating system version, verified boot state, and version of security patches.

Validation of device security level may include determining whether Root Of Trust fields are in a satisfactory condition.

In one embodiment, once the device security level is validated the trusted execution environment 106 decrypts an asset key from the metadata 120 and uses the asset key along with the starting address and length to decrypt the encrypted segment 122. Alternatively, any appropriate method of decrypting the encrypted segment 122 may be advantageously employed.

In an exemplary embodiment the trusted execution environment 106 includes a trusted application 126 and the rich execution environment 104 includes a SOP agent 124. The trusted application 126 is configured to receive the decryption request 158 from the SOP agent 124 and validate 160 an integrity of the agent 124. When the integrity is valid the encrypted segment 122 is decrypted to produce a decrypted segment 175. The decrypted segment 175 is returned 162 to the SOP agent 124. Validation of the SOP agent 124 by the trusted application 126 ensures that the decryption request is coming from a known source and that the SOP agent 124 has not been modified or otherwise corrupted by an attacker.

In an exemplary embodiment the encrypted segment 122 occupies a first memory area. Writing the decrypted segment 175 into the shared object 116 comprises one or more of writing the decrypted segment 175 back into the first memory area originally occupied by the encrypted segment 122, and writing the decrypted segment 175 into a second memory area and incorporating the second memory info the shared object 116.

Decryption of the encrypted segment 122 may produce a decrypted segment 175 having a different size than the encrypted segment 122. It can be advantageous to allocate a second memory area of the desired size and write the decrypted segment into this second memory area, rather than re-use the first memory area for the decrypted segment 175. Alternatively, it may be desirable to write a portion of the decrypted segment 175 into the first memory area and another portion of the decrypted segment 175 into the second memory area.

As will be discussed further below the exemplary computing apparatus 100 may be advantageously employed in a variety of computing devices such as mobile communications devices, mobile phones, tablet computers, phablets, automobiles, set top boxes, etc.

Figure 2:
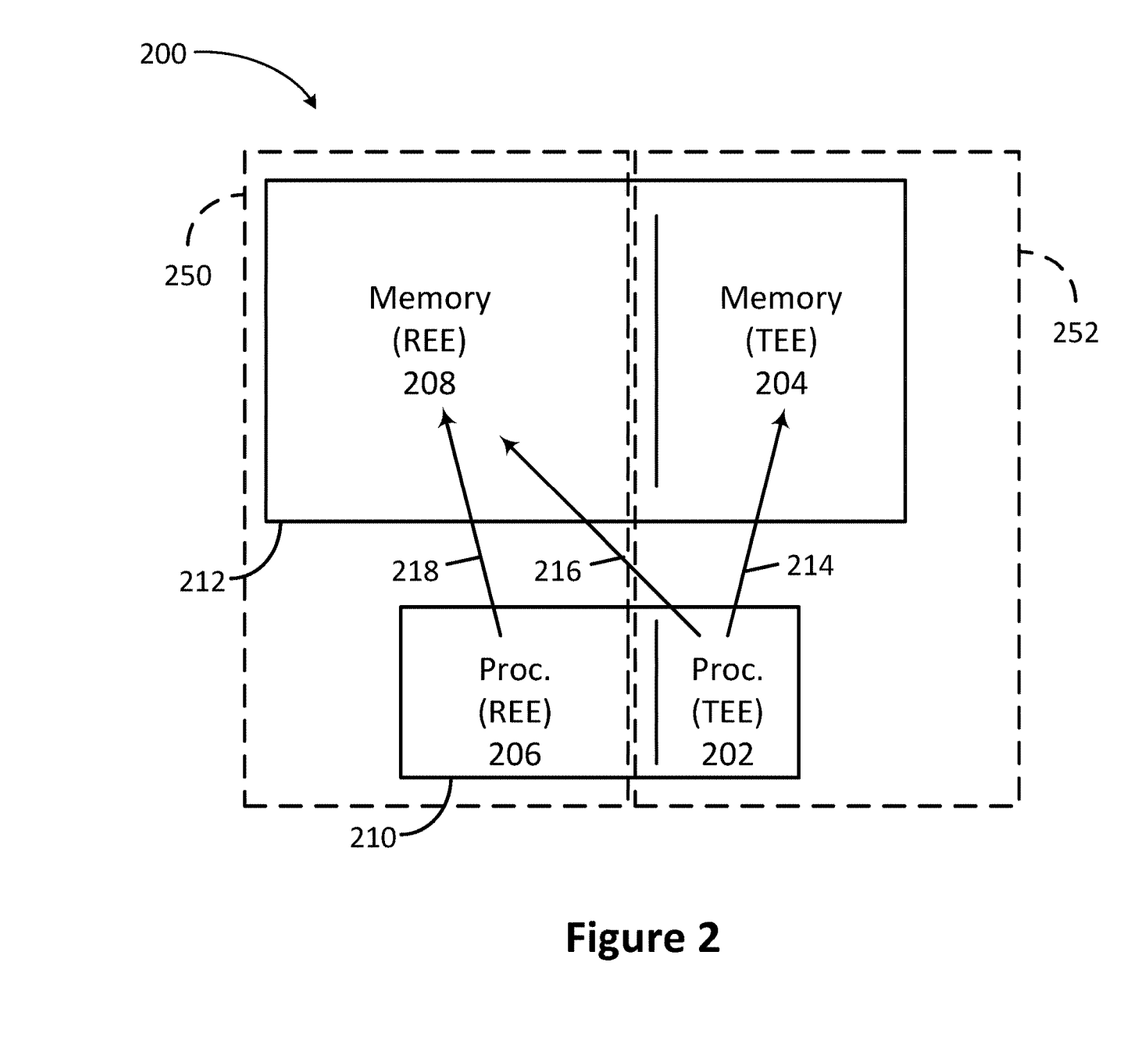
FIG. 2 illustrates a block diagram of an exemplary computing apparatus configured to provide a rich execution environment and a trusted execution environment incorporating aspects of the disclosed embodiments.

FIG. 2 illustrates a block diagram of an exemplary computing apparatus 200 configured to provide a rich execution environment (REE) 250 and a trusted execution environment (TEE) 252 incorporating aspects of the present disclosure. The computing apparatus 200 is appropriate for use in the computing apparatus 100 described above and with reference to FIG. 1. The computing apparatus 200 may be incorporated into various types of computing apparatus such as mobile phones, phablets, tablet computers, laptop computers, set top cable boxes, televisions, automobiles, etc., and can be advantageously employed to implement the apparatus and methods disclosed herein to protect shared objects deployed within the computing apparatus 200.

The REE 250 is configured to support a broad range of functionality and features to support a wide variety of applications and provide an enhanced user experience. However, this enhanced feature set and rich functionality available within the REE 250 is inherently less secure than the smaller and more targeted functionality provided by the TEE 252 and cannot safely perform cryptographic operations without risking loss of confidentiality, authenticity, or integrity of the cryptographic keys and algorithms. Examples of rich execution environments are those offered by operating systems (OS) such as the Android OS developed by GOOGLE™, the iOS operating system developed by APPLE™, the Windows operating system developed by MICROSOFT™, and the widely distributed LINUX OS™.

In the example of FIG. 2, the computing apparatus 200 includes a processor 210 coupled to a memory 212. A first portion of the processor 202 and a first portion of the memory 204 are configured to support a TEE 252. A second portion of the processor 206 and a second portion of the memory 208 are configured to support a REE 250.

The processor 210 may be a single processing device or may comprise a plurality of processing devices including special purpose devices, such as for example, digital signal processing (DSP) devices, microprocessors, specialized processing devices, parallel processing cores, or general purpose computer processors. The processor 210 is configured to read non-transitory program instructions from a memory 212 and perform any of the methods and processes described herein. The processor 210 may also include a central processing unit (CPU) working in tandem with a graphics processing unit (GPU) which may include a DSP or other specialized graphics processing hardware.

The memory 212 may be a combination of various types of volatile and non-volatile computer memory such as for example read only memory (ROM), random access memory (RAM), magnetic or optical disk, flash, or other appropriate types of computer memory. The secure portion of memory 204 may include a non-volatile or one-time programmable memory configured to protect confidential data such as the platform key 174 or other private or confidential cryptographic material.

The TEE 252 is configured to ensure the confidentiality and integrity of data and computer program instructions stored within TEE memory 204, and to protect the confidentiality and integrity of computer programs and associated data executing within the secure portion of the processor 202. The TEE 252, also referred to as a secure computing environment (SEE), may be implemented using any suitable technology adapted to provide both a REE 250 and a TEE 252 within a computing apparatus 200.

To maintain a security boundary between the TEE 252 and REE 250 the REE portion of the processor 206 is allowed access 218 only to the REE portion of the memory 208. Because the TEE 252 is a secure environment, the TEE portion of the processor 202 is allowed to access 214 the secure portion of the memory 204 and is also allowed to access 216 to the REE portion of memory 208.

Figure 3:
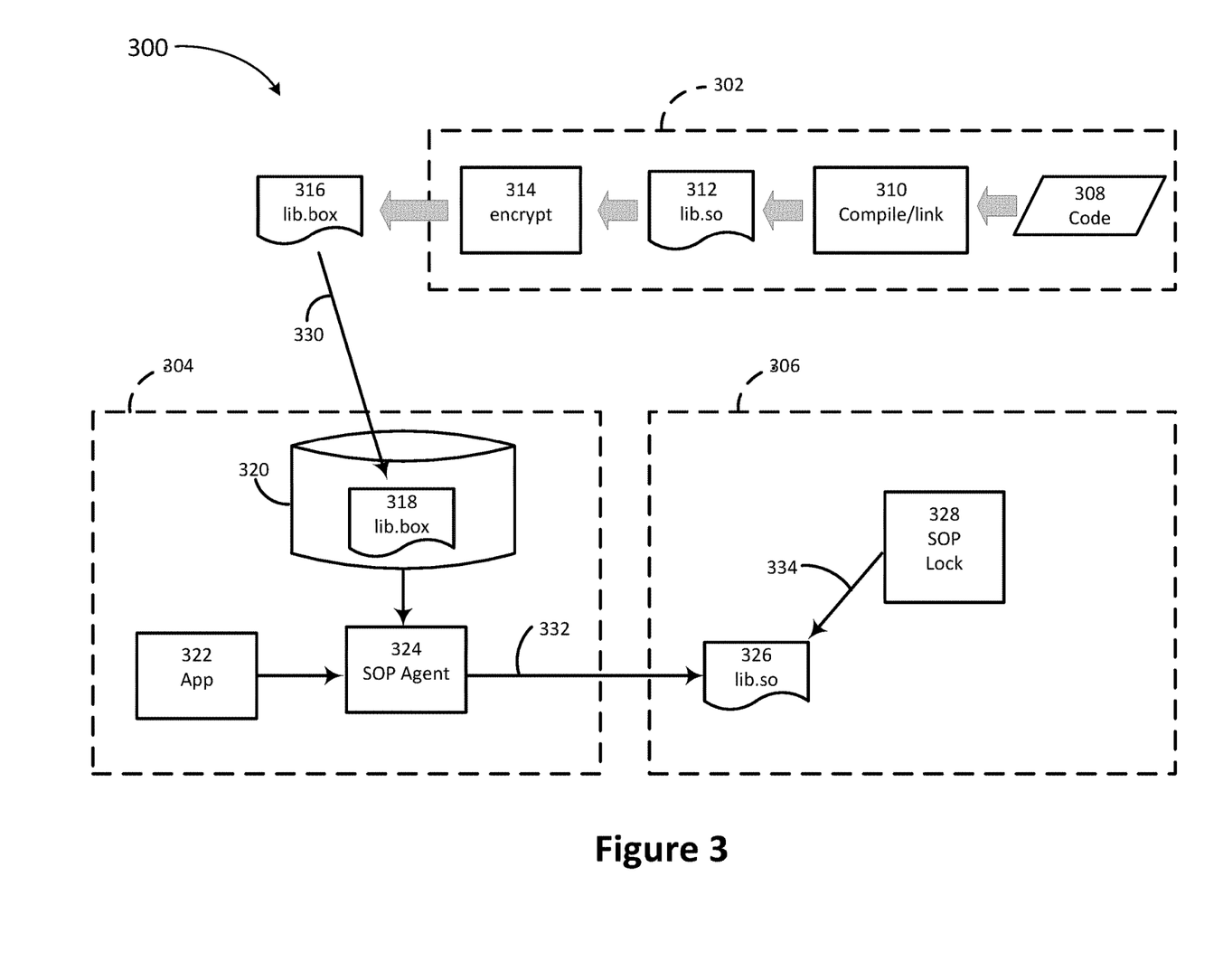
FIG. 3 illustrates a pictorial diagram illustrating a shared object lifecycle incorporating aspects of the disclosed embodiments.

Referring to FIG. 3 there can be seen a block diagram illustrating an exemplary lifecycle 300 of a shared object that is protected with shared object protection (SOP) incorporating aspects of the disclosed embodiments. SOP, when adapted as depicted in FIG. 3, prevents loss of software assets distributed as shared objects to third party developers.

A protected shared object 316 is created through a build process 302 and deployed 330 in non-volatile memory 320 within a computing apparatus. When an application requires use of the deployed shared object 318 a load process 304 prepares the shared object 326 for execution. Then, after the shared object 326 is loaded, memory protections 306 are applied to prevent unauthorized read access to the shared object 326.

The build process 302 is used when a shared object 312 containing valuable software assets is developed by a software company for sale and distribution to third party software developers or companies. To protect the software assets, the build process 302 is used to prepare and incorporate SOP into the shared object 316 in preparation for sale and distribution. Computer program instructions or program code 308 is developed and the code 308 is compiled and linked 310 to create a software library module lib.so 312. According to convention, software libraries are often named with a file extension ".so" indicating that they contain a shared object. Portions of the lib.so 312 are, as will be discussed further below, encrypted and packaged 314 to create a protected shared object 316. The packaged shared object 316 includes the shared object 312 in encrypted form along with metadata and when desired a constructor routine. The packaged shared object 316 is appropriate for use as the shared object 116 described above and with reference to FIG. 1.

The packaged shared object 316 is then deployed to non-volatile storage 320 in a computing apparatus, such as a mobile communication device or other desired type of computing apparatus, where it becomes available as a shared object 318 to be invoked or used by applications 322 executing on the computing apparatus.

When an application 322 needs to access functionality provided by a protected shared object 318, a SOP agent 324 is invoked to orchestrate loading, decrypting, and protecting of the shared object 326 while in runtime memory. When loading 304 is completed, a decrypted copy of the shared object 326 is loaded in runtime memory and the memory is locked to prevent loss of the contained software assets.

While the shared object 326 remains loaded 332, the memory is secured 306 by applying the SOP lock features described above. The SOP lock 328 or execute only designation applied 334 to the shared object 326 are configured at an elevated privilege level, such as the EL2 privilege level supported by ARM processors as described above.

Figure 4:
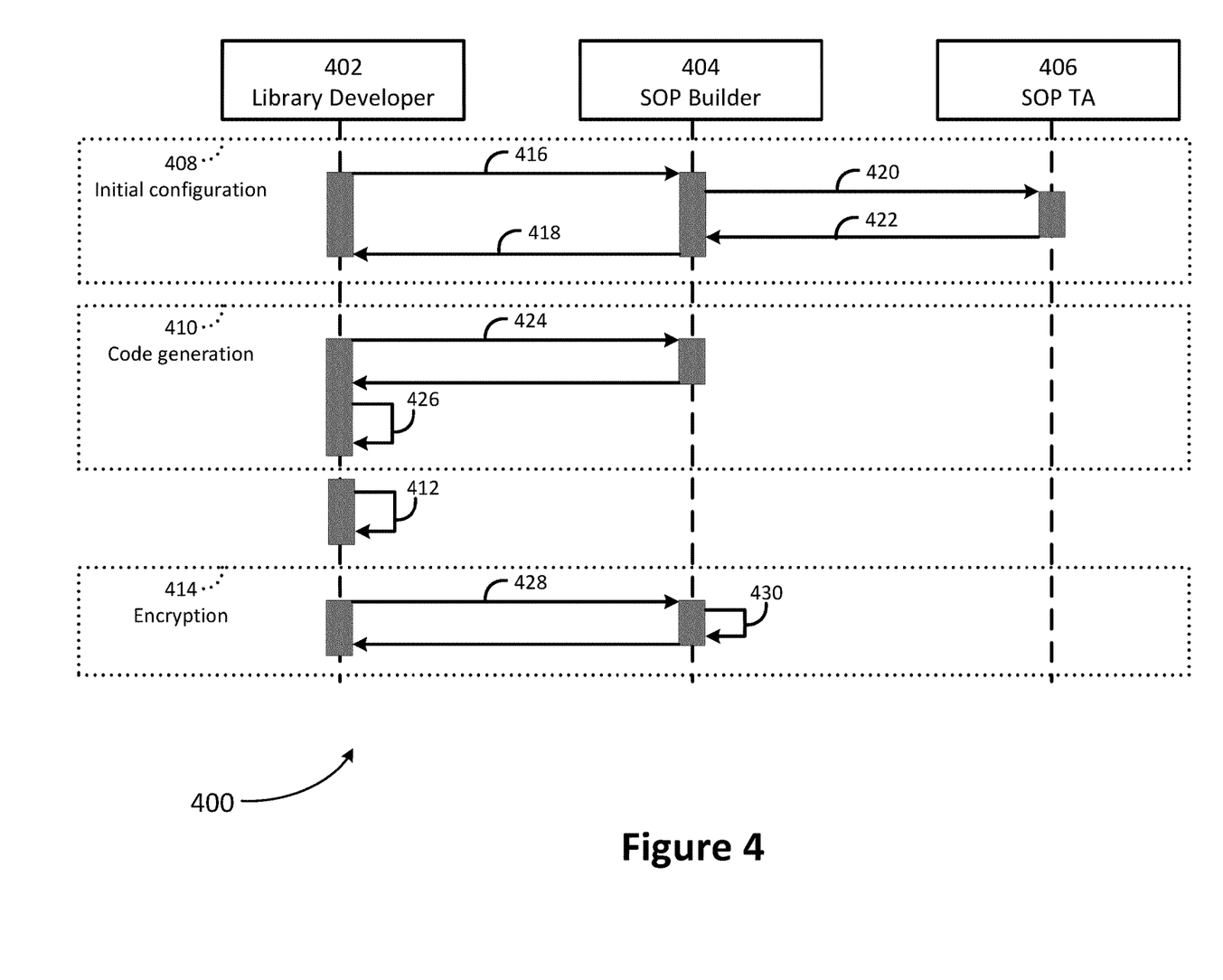
FIG. 4 illustrates a sequence diagram depicting an exemplary build process for generating protected shared objects incorporating aspects of the disclosed embodiments.

Referring to FIG. 4 there can be seen a sequence diagram illustrating an exemplary build process 400 for generating protected shared objects incorporating aspects of the disclosed embodiments. It is instructive to view the build process 400 as having three stages, an initial configuration stage 408, a code generation stage 410, and an encryption stage 414. The exemplary build process 400 may be advantageously employed to generate shared objects incorporating shared object protection to prevent theft or loss of software assets when distributed to third party software developers.

When preparing to build SOP protected shared objects, the build process 400 is configured with platform keys for all computing apparatus or devices being supported. A software developer or library developer 402 makes a request 416 to a SOP builder 404, requesting configuration of platform keys for a connected device. The SOP builder 404 in turn sends a request to retrieve the public portion of a platform key pair from a target device 406. Beneficially, the desired platform key is securely stored within a trusted execution environment within the computing apparatus and the request to retrieve the public platform key 420 is received by a trusted application executing within the trusted execution environment of the target device or computing apparatus 406. Any trusted execution environment that can securely protect the confidentiality of key material, such as the trusted execution environment 106 described above with reference to FIG. 1, or the trusted execution environment 252 described above with reference to FIG. 2, may be advantageously employed to provide the desired secure environment.

The requested public platform key is returned to the SOP builder 404, which in turn returns a confirmation 418 to inform the library developer 402 that configuration of the device 406 is complete and the pubic portion of the platform key has been loaded into the SOP builder.

Configuration 408 may be repeated for as many different computing apparatus 406 or device types as desired. In certain embodiments each computing apparatus 406 or device type, such as cell phone model, manufacturer, or carrier, will be populated with its own unique platform key. In embodiments where many different computing apparatus 406 having many different platform keys are to be supported, the SOP builder 404 needs to be configured with platform keys for each computing apparatus 406 being supported resulting in a plurality of platform keys being stored or configured n the SOP Builder 404.

During the code generation stage 410, the library developer 402 uses a tool provided by the SOP builder 424 to generate 424 custom constructor code and library scripts. The constructor code, which may be a constructor such as the constructor 118 described above. The custom linker scripts are used to identify and isolate sections of code that are to be marked as execute only, and also to reserve space for metadata and dummy sections within the target shared object. Constructor and linker scripts are then packaged 426 into the shared object. After the linker scripts have been run, the shared object can be compiled and linked using standard conventional processes.

Testing and debug of the shared object can be accomplished by temporarily configuring the constructor to skip the encryption step thereby allowing the compile/link/debug 412 cycle to be done using unprotected shared object code.

Once the shared object is ready for release, the encryption stage 414 is used to protect the shared object. During the encryption stage 414 a software developer 402 sends the compiled and linked shared object file to the SOP builder 404. The SOP Builder 404 encrypts and optionally signs any desired sections of the library and replaces the unencrypted sections with corresponding encrypted segments. The SOP Builder 404 then prepares metadata and includes the metadata in the shared object. In certain embodiments the SOP Builder 404 is configured to include encrypted information in the metadata to support decryption of the encrypted segment on any of a plurality of target platforms for which the platform keys were obtained during the configuration stage 408.

Figure 5:
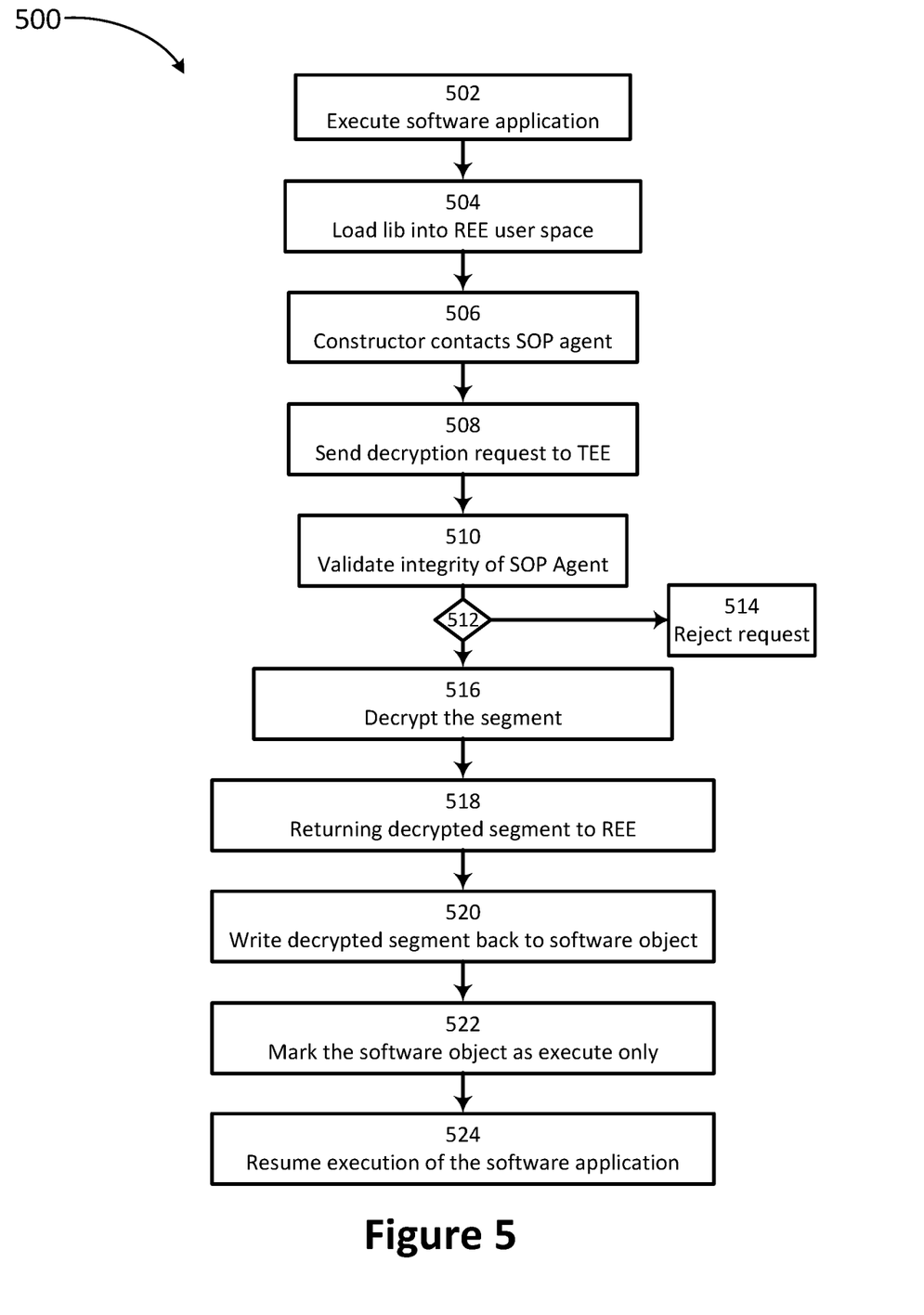
FIG. 5 illustrates a software flow diagram of an exemplary method for protecting shared objects incorporating aspects of the disclosed embodiments.

Referring now to FIG. 5 there can be seen a software flow diagram illustrating an exemplary method 500 for protecting shared objects while deployed in computing apparatus incorporating aspects of the disclosed embodiments. The aspects of the disclosed embodiments are directed to preventing the theft of software assets intended for distribution to and use by third party developers. The exemplary method 500 is appropriate for protecting the privacy of shared objects such as software libraries, software development kits (SDK) or other types of redistributable software assets.

In the illustrated embodiment an application executing 502 within user space identifies the need for a shared object and engages or calls a loader to load 504 the required shared object into user memory. Loading 504 of the shared object may occur at the time the application is loaded or may be otherwise triggered during execution of the application.

In the example of FIG. 5, the share object is loaded 504 into user memory of an appropriate rich execution environment of a computing apparatus, such as the rich execution environment 104 or 250 described above. The shared object may be loaded 504 from a non-volatile portion of memory or from any other desired computer memory or storage device.

In one embodiment, the shared object comprises an encrypted segment, a metadata, and a constructor routine or constructor code. Software assets being protected are encrypted prior to distribution of the shared object and placed into the encrypted segment. Encrypting protects the confidentiality of the encrypted segment while it is at rest or while being transmitted over a computer network. The metadata includes information which may be used to decrypt or otherwise reassemble the encrypted segment in preparation for execution, and the constructor may, as described above, be run during loading 504 of the shared object and communicate with a SOP Agent during preparation of the shared object for execution.

During or after loading 504 of the shared object, the constructor contacts 506 a SOP Agent to orchestrate preparation of the shared object for execution. Decryption of encrypted portions of the shared object, such as an encrypted segment, is achieved by sending 508 a decryption request to a trusted execution environment, such as any of the trusted execution environments 106, 252 described above and with reference to FIGS. 1 and 2, respectively. The request for decryption may include an encrypted segment along with metadata that provides information and key data necessary to perform the decryption. In certain embodiments the metadata passed to the trusted execution environment is the same metadata included in the loaded shared object. Alternatively, the constructor code and/or the SOP Agent may construct the metadata based on the contents of the shared object.

In the exemplary method 500 a trusted application running within the trusted execution environment handles processing of the decryption request. In one embodiment, the trusted application validates 510 integrity of the SOP Agent prior to processing of the decryption request to ensure the SOP Agent has not been infected with a virus or otherwise compromised. Results of the validation are checked 512 and the request for decryption is rejected 514 when the integrity check fails.

When integrity of the SOP Agent is found to be valid, the encrypted segment is decrypted 516 and the resulting decrypted segment is returned 518 to the SOP Agent executing in the rich execution environment.

The decrypted segment is then written 520 to the user memory and incorporated into the shared object. The decrypted segment may be written back to the same memory originally occupied by the encrypted segment, or alternatively, the decrypted segment may be written to a newly allocated portion of user memory that is then configured to be part of the shared object.

In the illustrated embodiment the software application, SOP Agent, and other user applications execute at a first privilege level. The first privilege level is configured to prevent programs executing at the first privilege level from performing any memory management operations such as modifying the access privileges of memory occupied by the shared object. Memory management operations are only allowed by programs, such as a SOP Lock program, executing at a second privilege level where the second privilege level comprises an elevated or less restrictive privilege level as compared to the first privilege level.

The SOP Lock program locks 522, while executing at the second privilege level, memory occupied by the shared object. The lock allows user space applications executing at the first privilege level to execute the locked code, but prevents reading or modifying of the locked memory, thereby preventing theft of the software assets contained in the shared object. Execution of the user space application may now be resumed 524 and the application may begin using the features provided by the shared object.

In an exemplary embodiment of the method 500 descried above, the encrypted segment is encrypted based on an asset key. The metadata included in the shared object comprises an encrypted asset key where the encrypted asset key comprises the asset key encrypted with a predetermined platform key, such as the predetermined platform key 174 described above with reference to FIG. 1. Employing symmetric key cryptography for the asset key and asymmetric key cryptography for the platform key, reduces processing costs associated with decrypting the encrypted segment while at the same time providing the improved security benefits of asymmetric cryptography including the associated PKI (private key infrastructure).

In one embodiment the metadata may include a plurality of encrypted asset keys, where each encrypted asset key comprises the same asset key encrypted with a different one of a plurality of predetermined platform keys. During decryption, the trusted application can select the encrypted key from the plurality of encrypted keys that is encrypted based on the predetermined asset key available to the trusted application. By including the plurality of encrypted asset keys, a single build of the shared object may be used on multiple different types of computing apparatus where the different types of computing apparatus have different predetermined platform keys.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
a memory configured to store instructions;
a processor coupled to the memory, wherein when executed by the processor, the instructions cause the apparatus to:
provide a rich execution environment and a trusted execution environment, wherein a secure memory and processes in the trusted execution environment are protected from access or modification by applications executing within the rich execution environment;
provide, within the rich execution environment a first computing environment configured to execute at a first privilege level and a second computing environment configured to execute at a second privilege level, wherein the first privilege level is more restrictive than the second privilege level;
load, within the rich execution environment, a shared object into a user memory, wherein the shared object comprises an encrypted segment and a metadata;
send, from the rich execution environment, a request for decryption to the trusted execution environment, wherein the request for decryption comprises the metadata and the encrypted segment;

decrypt, within the trusted execution environment and based on the metadata and a predetermined platform key, the encrypted segment to produce a decrypted segment;

send, from the trusted execution environment, a decryption response comprising the decrypted segment to the rich execution environment;

receive, within the rich execution environment, the decryption response from the trusted execution environment;

write the decrypted segment into the shared object;

send, from the first computing environment to the second computing environment, a request to lock the shared object; and set, while executing at the second privilege level, a memory segment occupied by the shared object to execute only.

2. The apparatus of claim 1, wherein the metadata comprises an encrypted asset key comprising an asset key encrypted based on the predetermined platform key, and wherein the instructions further cause the apparatus to:

decrypt, within the trusted execution environment, the encrypted asset key based on the predetermined platform key; and decrypt the encrypted segment based on the decrypted asset key.

3. The apparatus of claim 2, wherein the metadata comprises a plurality of encrypted keys each comprising the asset key encrypted based on a different platform key from a plurality of platform keys, and wherein the instructions further cause the apparatus to select an encrypted key from the plurality of encrypted keys based on the predetermined platform key.

4. The apparatus of claim 1, wherein the request for decryption is sent by an agent executing within the rich execution environment, and wherein the instructions further cause the apparatus validate, within the trusted execution environment, an integrity of the agent before decrypting the encrypted segment.

5. The apparatus of claim 1, wherein the predetermined platform key is a public portion of an asymmetric key pair.

6. The apparatus of claim 1, wherein the asset key is a symmetric key.

7. The apparatus of claim 1, wherein the rich execution environment comprises a third computing environment configured to execute at a third privilege level, wherein the second privilege level is more restrictive than the third privilege level, and wherein the instructions further cause the apparatus to, while executing at the third privilege level, set the memory to execute only.

8. The apparatus of claim 1, wherein the first computing environment comprises a user application, the second computing environment comprises an operating system, and the third computing environment comprises a hypervisor.

9. The apparatus of claim 1, wherein the shared object comprises a constructor routine that, when executed by the processor, causes the apparatus to send the decryption request.

10. The apparatus of claim 1, wherein the rich execution environment comprises an agent, and wherein the trusted environment comprises a trusted application that, when executed by the processor, causes the apparatus to:

receive the decryption request from the agent;

validate the integrity of the agent; and when the integrity is validated, the encrypted segment to produce the decrypted segment and return the decrypted segment to the agent.

11. The apparatus of claim 1, wherein the encrypted segment occupies a first memory area, and wherein writing the decrypted segment comprises one of writing the decrypted segment into the first memory area, writing the decrypted segment into a second memory area, or incorporating the second memory area into the shared object.

12. The apparatus of claim 1, wherein the apparatus comprises a mobile communications apparatus.

13. A method implemented by a computing device, wherein the method comprises:

loading, within a rich execution environment, a shared object into a user memory, wherein the shared object comprises an encrypted segment, a metadata, and a constructor routine;

sending from the rich execution environment, a request for decryption to a trusted execution environment, wherein the request for decryption comprises the metadata and the encrypted segment;

decrypting, within the trusted execution environment and based on the metadata and a predetermined platform key, the encrypted segment to produce an unencrypted segment;

sending, from the trusted execution environment, a decryption response comprising the decrypted segment to the rich execution environment;

receiving, within the rich execution environment, the decryption response from the trusted execution environment;

writing the decrypted segment into the shared object;

setting, during executing at a second privilege level, a memory segment occupied by the shared object to execute only; and accessing, at a first privilege level, the shared object from a user application, wherein the first privilege level is more restrictive than the second privilege level.

14. The method of claim 13, wherein the encrypted segment is encrypted based on an asset key, wherein the metadata comprises an encrypted asset key comprising the asset key encrypted based on the predetermined platform key, and wherein the method further comprises:

decrypting, within the trusted execution environment, the encrypted asset key based on the predetermined platform key; and decrypting, within the trusted execution environment, the encrypted segment based on the asset key.

15. A program product comprising computer-executable instructions that are stored on a non-transitory computer readable medium and that, when executed by a processor, cause a device to:

load, within a rich execution environment, a shared object into a user memory, wherein the shared object comprises an encrypted segment, a metadata, and a constructor routine;

send from the rich execution environment, a request for decryption to a trusted execution environment, wherein the request for decryption comprises the metadata and the encrypted segment;

decrypt, within the trusted execution environment, the encrypted segment to produce an unencrypted segment, wherein the decryption is based on the metadata and a predetermined platform key;

receive, within the rich execution environment, a decryption response from the trusted execution environment, wherein the decryption response comprises a decrypted segment;

write the decrypted segment into the shared object;

set, during executing at a second privilege level, a memory segment occupied by the shared object to execute only; and access, at a first privilege level, the shared object from a user application, wherein the first privilege level is more restrictive than the second privilege level.

16. The method of claim 14, wherein the metadata comprises a plurality of encrypted keys each comprising the asset key encrypted based on a different platform key from a plurality of platform keys, and wherein the method further comprises selecting an encrypted key from the plurality of encrypted keys based on the predetermined platform key.

17. The method of claim 13, wherein the request for decryption is sent by an agent executing within the rich execution environment, and wherein the method further comprises validating, within the trusted execution environment, an integrity of the agent before decrypting the encrypted segment.

18. The method of claim 13, wherein the rich execution environment comprises a third computing environment configured to execute at a third privilege level, wherein the second privilege level is more restrictive than the third privilege level, and wherein the method further comprises, during executing at the third privilege level, setting the memory to execute only.

19. The method of claim 13, wherein the shared object comprises a constructor routine that causes sending the decryption request.

20. The method of claim 13, wherein the rich execution environment comprises an agent, and wherein the method further comprises when executing a trusted application in the rich execution environment:

receiving the decryption request from the agent;

validating the integrity of the agent; and decrypting, when the integrity is validated, the encrypted segment to produce the decrypted segment and return the decrypted segment to the agent.

* * * * *

UNITED STATES PATENT AND TRADEMARK OFFICE
CERTIFICATE OF CORRECTION

PATENT NO. : 12,197,563 B2
APPLICATION NO. : 17/792292
DATED : January 14, 2025
INVENTOR(S) : Sampo Sovio et al.

It is certified that error appears in the above-identified patent and that said Letters Patent is hereby corrected as shown below:

On the Title Page

Item (71) "Huawei Technologies Co., Ltd., Shenzhen (CN); Sampo Sovio, Helsinki (FI)" should read "Huawei Technologies Co., Ltd., Shenzhen (CN)"

Item (56) References Cited, U.S. Patent Documents missing: "9,924,041 B1 04/2018 Roth et al."

In the Claims

Claim 10, Column 18, Line 1: "when the integrity" should read "decrypt, when the integrity"

Signed and Sealed this
Fourth Day of March, 2025

Coke Morgan Stewart
*Acting Director of the United States Patent and Trademark Office*